UNITED STATES PATENT OFFICE.

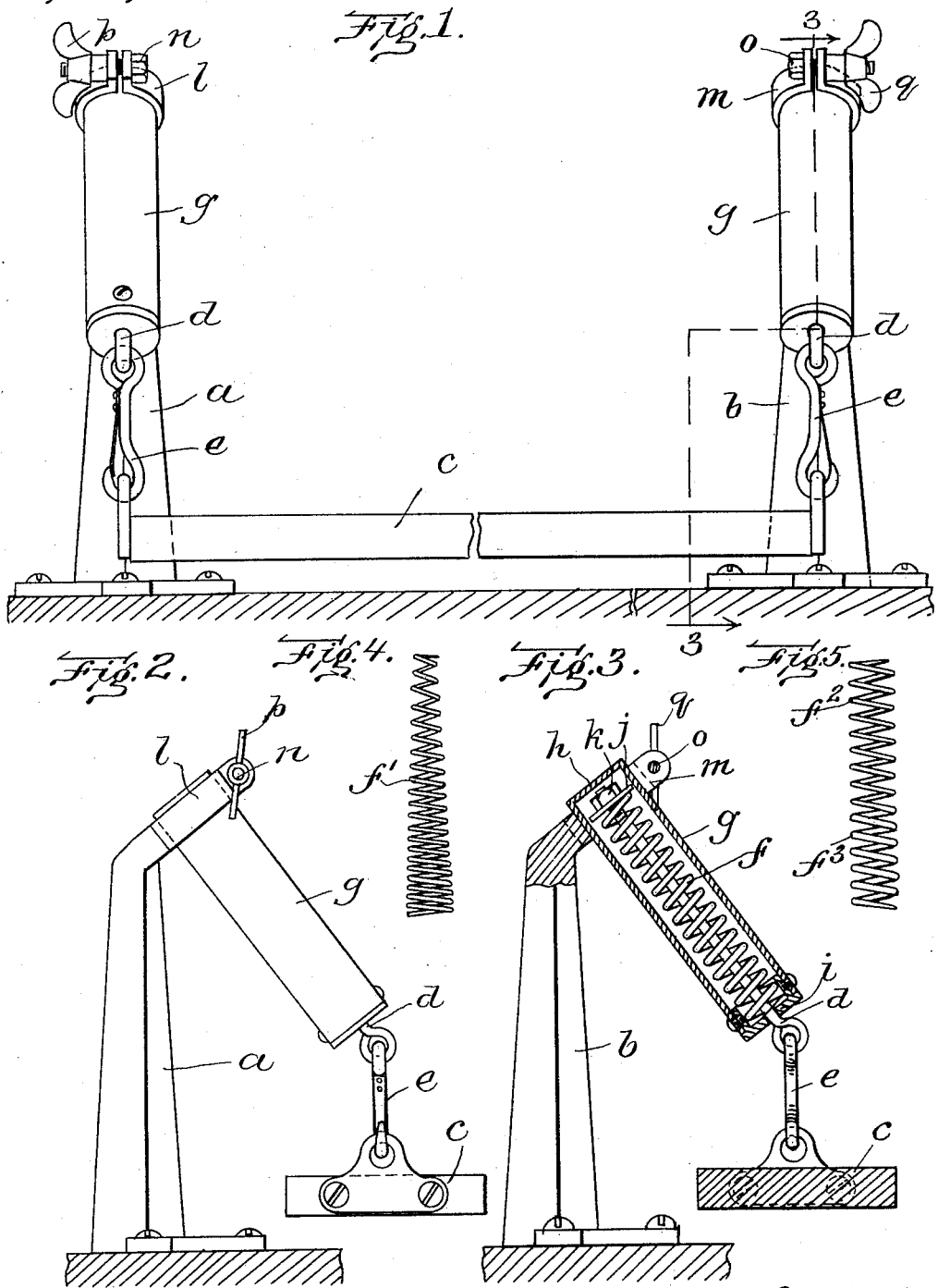
J. O. CALDWELL, Jr.
FLEXIBLE FOOT REST.
APPLICATION FILED AUG. 16, 1909.
1,113,601. Patented Oct. 13, 1914.

JOHN O. CALDWELL, JR., OF BOSTON, MASSACHUSETTS, ASSIGNOR OF ONE-HALF TO JOHN O. CALDWELL, SR., OF BOSTON, MASSACHUSETTS.

FLEXIBLE FOOT-REST.

1,113,601.      Specification of Letters Patent.      Patented Oct. 13, 1914.

Application filed August 16, 1909. Serial No. 512,997.

*To all whom it may concern:*

Be it known that I, JOHN O. CALDWELL, Jr., of Boston, in the county of Suffolk and State of Massachusetts, have invented certain new and useful Improvements in Flexible Foot-Rests, of which the following is a specification.

The object of the present invention is to provide a yielding elastic foot-rest for vehicles, particularly motor vehicles which are subject to a great amount of jar and shock, in order to increase the ease and comfort of travel in such vehicles. The greater part of the shock and jar which is felt by occupants of such vehicles is administered through their feet, and it is my object to diminish and destroy as far as possible the effects of the jarring by enabling the feet of the occupants to be yieldingly supported in such a way that the jolting, caused by uneven ground, is wholly, or in large measure, absorbed.

The invention consists of a yieldingly-supported foot-piece adapted to be applied to any vehicle and in any convenient position.

Of the accompanying drawings,—Figure 1 represents a front elevation of a foot-rest embodying my invention. Fig. 2 is a side elevation of the same. Fig. 3 is a sectional view of the foot-rest. Figs. 4 and 5 represent two forms of spring employed in connection with my foot-rest by which the resistance to yielding of the foot support is increased as the movement of the foot-piece increases.

The same reference characters indicate the same parts in all the figures.

The complete flexible foot-rest consists of two standards $a$ $b$ and a foot-piece $c$ yieldingly and elastically hung from and between said standards. The suspension for the foot-piece consists of rods $d$ linked by means of hooks $e$ to the ends of the foot-piece and supported by springs $f$ in closed cylindrical casings $g$, which are secured to and supported by the standards $a$ $b$. The casings consist of circular sections of tubing closed at each end by heads $h$ and $i$, one of which is preferably integral with the casing and the other detachable. The rods pass through the heads or caps on the lower ends of the casings and normally extend throughout nearly the entire length of the casings. On the end of each rod is a washer $j$ and nut $k$, and the spring $f$ is contained between the washer and the lower end or cap $i$ of the casing. Thus whenever, in consequence of jolting by the vehicle, additional pressure is applied to the foot-rest, the rods are drawn downward and the springs compressed, thus diminishing the shock to the occupant of the vehicle. The spring is only one form of resilient element which may be used to absorb shocks. The washer $j$ also forms a piston extending across the casing, and the imprisoned body of air between the piston and lower head of the casing serves in part as the elastic shock absorber, supplementing the action of the spring. If desired, the washer may be made to bear on the walls of the casing and the spring omitted.

The upper ends of the standards are provided with straps or collars $l$ $m$ within which the casings are held. Conveniently the straps may be made as integral parts of the standards, and their ends engaged with bolts $n$ $o$ passing through flanges on the straps. Wing nuts $p$ $q$ are threaded on these bolts, by means of which the rings may be clamped tightly about the casings, thus enabling the latter to be held at any convenient or desired height.

An important feature of my invention is the construction of the springs by which one foot-piece is enabled to be used for giving yielding support to the feet of one or more persons, and to have an approximately equal resilience when used by one as when used by two or more persons. In carrying into effect this feature of the invention the springs are made so as to yield with comparative readiness to the initial movements of the foot-piece and to increase their resistance to the succeeding increments of motion of the foot-piece. Thus a spring which may be strong enough to give a resilient support to the feet of two or more persons will also have a sufficient amount of resilience to give comfortable yielding support to the feet of only one person. Two forms of spring adapted for this purpose are illustrated respectively in Figs. 4 and 5. In the former figure, the spring $f'$ is made of the same size of wire throughout, but the coils at the top are wound on a curve of smaller radius than those at the bottom, so that the spring as a whole has a conical form. At the same time, the convolutions are more widely spread apart at the top than at the bottom. By this construction, when pressure is applied to the foot-piece, the upper coils are first compressed under a comparatively light pressure, while when the pressure is increased, the lower coils are compressed and impart a continually increasing resistance. The amount of movement permitted by the upper coil under a light thrust is sufficient to give the requisite degree of resilience when the foot-rest is used by only one person, while the coils at the bottom give stiffness enough to support the feet of two or more persons. This furnishes a spring sufficiently stiff to absorb the shock when used by a number of persons, and at the same time is not too stiff to afford comfort to a single person.

In Fig. 5, the spring shown is a compound one, consisting of a light spring $f^2$ at the top joined to a heavier and stiffer spring $f^3$ at the bottom. In this form of the invention the springs are wound on the same diameter and are spread equally, but are made of stock of different degrees of stiffness.

I claim:—

1. A foot rest comprising a pair of standards, casings secured rigidly to the upper ends of said standards and making an acute angle therewith, a spring contained in each of said casings, a rod projecting from the lower end of each casing, movable end-wise in and out of the same and engaged with said spring, and a foot piece hung from the said rods.

2. A foot rest for vehicles comprising a pair of standards adapted to be secured to the floor of the vehicle in front of the seat thereof, spring holders having guiding portions secured to the upper ends of said standards, rods engaged with the guiding portions of said spring holders and movable end-wise with respect thereto, said rods being so guided as to extend on a downward slant away from the vehicle seat, springs so engaged with said holders and with the respective rods, as yieldingly to resist downward movement of the latter, and a foot piece hung from said rods.

In testimony whereof I have affixed my signature, in presence of two witnesses.

JOHN O. CALDWELL, Jr.

Witnesses:
JOSEPH SELIG,
JOHN CALDWELL, Sr.

Copies of this patent may be obtained for five cents each, by addressing the "Commissioner of Patents, Washington, D. C."